Sept. 13, 1927.

E. ALLEN

WIRE ROPE FITTING

Filed Jan. 8, 1926

1,642,573

Edgar Allen
INVENTOR.

BY G. C. Waldrop

ATTORNEY.

Patented Sept. 13, 1927.

1,642,573

UNITED STATES PATENT OFFICE.

EDGAR ALLEN, OF WICHITA FALLS, TEXAS.

WIRE-ROPE FITTING.

Application filed January 8, 1926. Serial No. 80,107.

This invention relates to new and useful improvements in wire rope fittings and more particularly to the application thereof, the primary object of which is to provide an assembly of fittings which may be universally applicable, especially in connection with the use of cable for drilling purposes and other oil field operations.

Another object of the invention comprehends the provision of a combination of fittings for various duties having a common securing means, whereby when required an element may be detached from the end of a cable, and another substituted without altering the cable, to conform.

With the foregoing and other objects and advantages in view, this invention embodies certain novel features of construction and arrangement of parts, which will become apparent as the description proceeds, taken in connection with the accompanying drawings, wherein.

Although, various forms of rope and cable fittings are known to be in existence, certain of these forms of fittings employ threads in their construction to maintain their operativeness, while others are constructed in such a manner as to make accidental release of the cable therefrom possible, thereby condemning the fittings for use in oil field operations due to the dangers that exist through such an occurrence.

The present invention is directed to devices having a positive securing means which cannot be dislodged through unusual movements of the cable, and by reason of this fact alone renders the fittings of exceptional value in operation as aforesaid.

Figure 1:
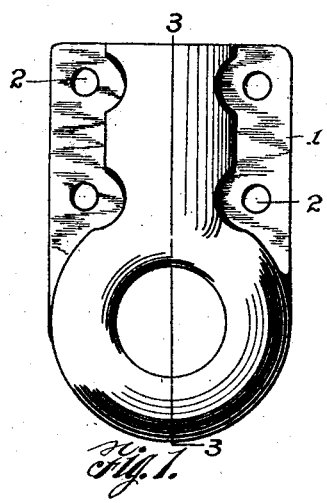
Figure 1 represents an elevational view of a cable end embodying a ring clamp.

In proceeding in accordance with the foregoing, the Figures 1 to 6 are directed to fittings comprising two pieces in assembly providing a connection of universal durability and function. Figure 1 illustrates a ring clamp, comprising side plates 1—1, in which apertures 2 are made to receive an equal number of bolts 3.

Figure 5:
Figure 5 represents a detail view of a rope terminal universally applicable to the different forms of fittings shown.

The cable 4 is equipped with a frusto-conical terminal 5, illustrated in detail in Figure 5, which is applied to the cable by threading said terminal over the end of the cable, and separating and turning back the end strands of the cable, drawing the terminal 5 forward to cover the end and filling the terminal with molten babbitt to fill the interstices between the strands, as usually done in other modes of applying fittings.

Figure 2:
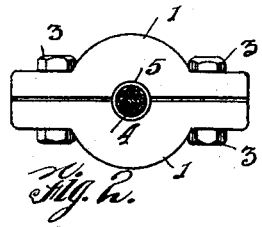
Figure 2 is a top plan view thereof.
Figure 3:
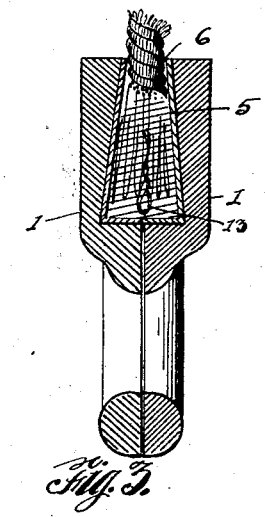
Figure 3 is a sectional side elevation of Figure 1 on lines 3—3.

Each of the plates 1 in Figures 1 to 3 is provided with a groove 6 of frusto-conical shape, which when fitted together, form a frusto-conical cavity to receive the terminal 5 on the end of the cable, after which the plates are securely bolted together to hold the terminal securely in place.

It is readily apparent that release of the cable through accidental jar or peculiar manipulation is impossible, and only by removing the bolts 3 is this possible.

Figure 4:
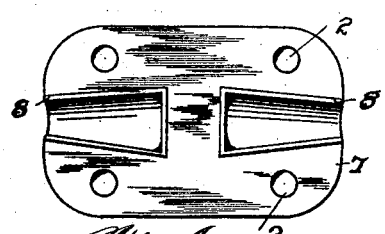
Figure 4 represents a cable splice.
Figure 6:
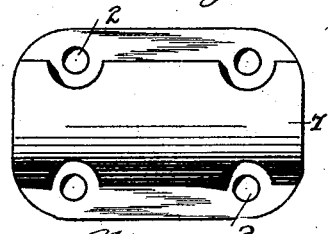
Figure 6 is an exterior view of the splice illustrated in Figure 4.

Now, in the Figures 4 and 6, a splicing device is shown which is applied in similar manner as that of the ring clamp just described. This device consists likewise of conforming plates 7, each provided with an oppositely directed frusto-conically formed groove 8, of identical shape as that shown in Figure 3. These grooves when fitted together receive the terminals on the ends of cables after which the plates are securely bolted in place.

Figure 7:
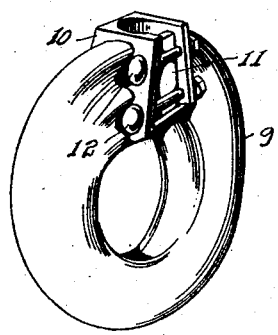
Figure 7 is another form of ring clamp.
Figure 8:
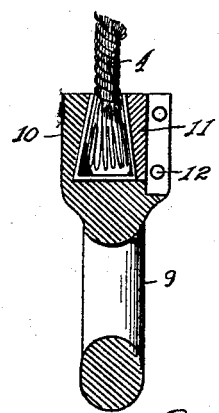
Figure 8 is a side elevational view of Figure 7 partly in section.

A modified example of ring clamp is illustrated in Figure 7 of the drawings. This clamp is especially valuable in heavy work such as pulling casings and in like operations, and comprises a solid ring 9, in which a socket 10 is formed as shown. The cable terminal 5 is inserted into this socket, and a prism plate 11 inserted thereafter, and the bolts 12 are mounted through the socket to hold the plate from displacement.

For purposes of convenience in moving the cable end from place to place after the fitting has been removed, a small wire loop 13 is babbitted into the end of the cable when the terminal 5 is applied, as shown exclusively in Figure 3, to which a line may be secured.

What is claimed is:

1. In a cable clamping device, a cable, a hollow frusto-conical terminal for receiving an end of the cable therein and having a closed bottom, a member including a ring and a frusto-conical socket designed to be opened to receive or release said terminal and closed to hold the same, and means for securely closing said socket upon said terminal and permitting said terminal to turn within said socket.

2. In a cable clamping device, a cable, a hollow frusto-conical terminal for receiving an end of the cable therein and having a closed bottom, two cooperating plates having complementary grooves to provide a frusto-conical cavity for holding said terminal and allowing it to turn within said cavity, and means for fastening said plates together.

3. In a cable clamping device, a cable, a hollow frusto-conical terminal for receiving an end of the cable therein and having a closed bottom, two cooperating plates having upper and lower portions said upper portions being formed with complementary grooves designed to provide a frusto-conical cavity for holding said terminal and said lower portions being designed to form a ring, and means for fastening said plates together.

In testimony whereof I affix my signature.

EDGAR ALLEN.